A. E. JOHNSON.
DEVICE FOR BREAKING HENS FROM SETTING.
APPLICATION FILED APR. 12, 1916.
1,258,684. Patented Mar. 12, 1918.
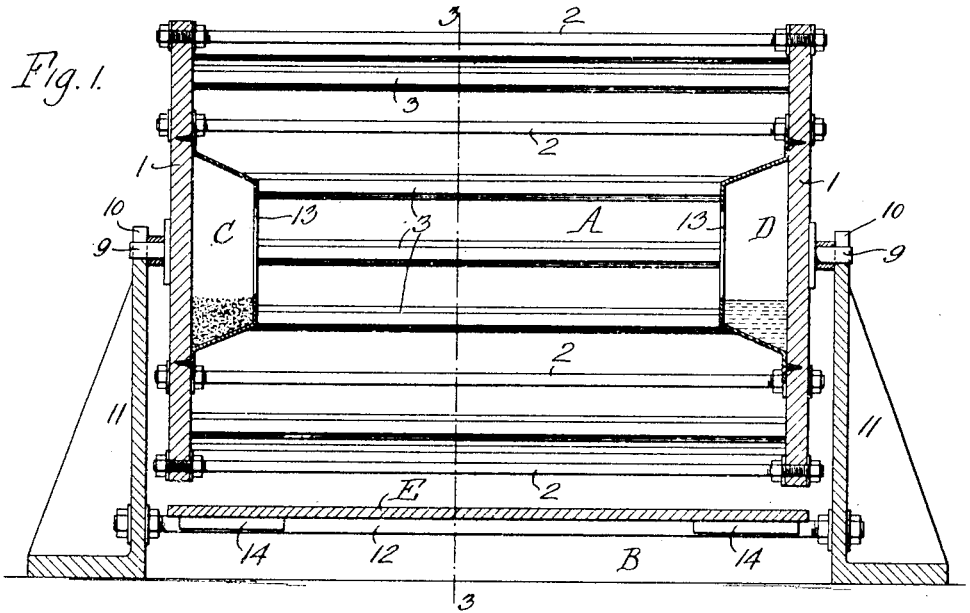
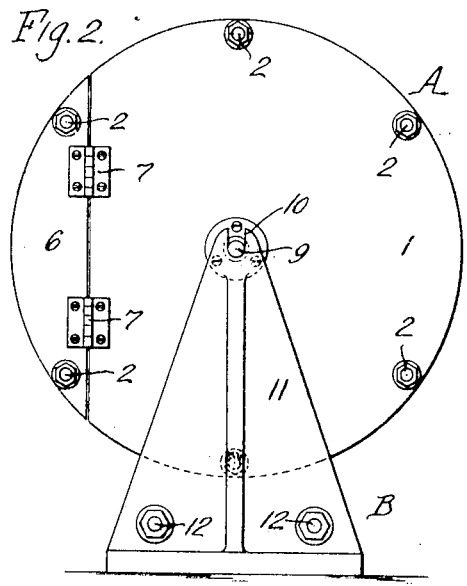
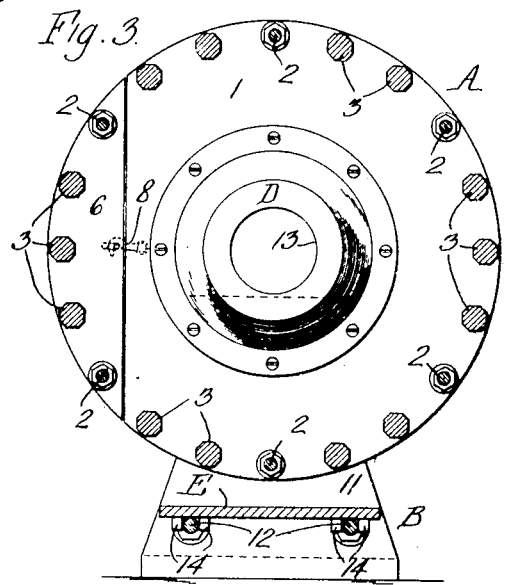
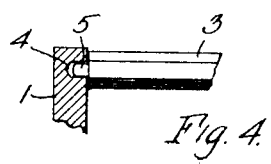
Inventor.
Albert E. Johnson.
by Wilhelm & Parker
Attorneys.

UNITED STATES PATENT OFFICE.

ALBERT E. JOHNSON, OF SANBORN, NEW YORK.

DEVICE FOR BREAKING HENS FROM SETTING.

1,258,684.     Specification of Letters Patent.     Patented Mar. 12, 1918.

Application filed April 12, 1916. Serial No. 90,730.

*To all whom it may concern:*

Be it known that ALBERT E. JOHNSON, a citizen of the United States, residing at Sanborn, in the county of Niagara and State of New York, has invented a new and useful Improvement in Devices for Breaking Hens from Setting, of which the following is a specification.

This invention relates to a device for breaking hens from setting, and has for its object to produce a practical and desirable device of simple and inexpensive construction which will effectually and quickly break hens from setting without injuring or unduly disturbing them.

The device comprises a cage which is rotatably mounted so as to be revolved or oscillated by the movements of the hens confined therein, and is provided with perches or bars which are journaled in the cage so that when a hen attempts to sit or rest on one of the bars, the bar will rock or turn about its axis, thus making it difficult for the hen to maintain a balance and preventing her from resting quietly. Not only the cage turns but, in addition, the bars or perches are adapted to turn about their respective axes. The cage is also provided with food and water receptacles so arranged that the contents thereof will be readily accessible to the hens in the cage and will not be spilt by the rotation of the cage.

In the accompanying drawings:

Figure 1 is a longitudinal sectional elevation of a device embodying the invention for preventing hens from setting.

Fig. 2 is an end elevation thereof.

Fig. 3 is a transverse sectional elevation thereof in line 3—3, Fig. 1.

Fig. 4 is a sectional elevation showing one of the journals and bearings for the perches.

A represents the rotary cage which preferably consists of circular ends 1 connected by stay rods or bolts 2 and by bars or perches 3 which are suitably journaled at their ends in the end pieces so as to turn about their axes. As shown, the stay rods or bolts 2 pass through holes in the end pieces 1 and are secured thereto by nuts screwed on the threaded ends of the stay rods or bolts at opposite sides of each end piece. The end pieces are thus rigidly connected and firmly held in the intended position. The bars or perches 3 are arranged at suitable intervals around the periphery of the cage close enough together to confine the hens in the cage and are preferably journaled at their ends and are adapted to revolve in holes 4 in the inner sides of the end pieces. The perch bars 3 are preferably made of wood and are provided with metal journal pins 5 seated in the holes 4 to insure the free turning of the bars. The stay rods or bolts 2, in the construction shown, are arranged between adjacent perch bars 3, the perch bars and stay rods being spaced about equidistant around the periphery of the cage. The stay rods or bolts are too small in diameter to serve as perches and it is not necessary for these to revolve. The cage can be provided with a door or movable section of any suitable sort adapted to be opened for placing the hens in and removing them from the cage. Preferably the cage is provided at one side with a movable section 6 consisting, like the remainder of the cage, of end pieces connected by stay bolts or perch bars, and this movable section is hinged at one end to the main portion of the cage, as by hinges 7, and a fastening device 8 of any suitable sort is provided at the other end for securing the movable section or door in closed position.

The cage can be mounted to rotate freely on a stand or support B of any suitable kind. As shown, the cage is provided centrally at its opposite ends with journals 9 which are removably seated in open slots or bearings 10 in the upper ends of upright supports 11 which are rigidly connected to form the stand, as by means of stay rods or bolts 12 secured by nuts to the end supports. The cage can be readily lifted off of the support when desired for cleaning the cage or for any other reason. A stand or supporting means of any other suitable construction on which the cage is mounted to rotate in any convenient way could be employed.

C and D represent receptacles, one for food and the other for water, for the hens in the cage. These receptacles are preferably of circular pan-like form and secured on the inner side of the end pieces 1 of the cage concentric with the axis thereof, the receptacles being provided in their inner walls with central openings 13 through which the hens can reach the food or water. These central openings leave annular walls by which the food and water are confined in the lower portion of the receptacles. As the cage revolves, the food or water remains in the lower portion of the receptacles below the lower edge of the openings thereof, and is not split or wasted by the rotation of the cage. The food and water are nevertheless accessible at all times to the hens in the cage.

E represents a dropping board which is supported beneath the cage between the ends of the supports B. This board, as shown, rests on the stay bolts of the support, and is removably retained in position thereon by cleats or strips 14 secured to the underside of the dropping board and adapted to straddle the stay rods. The dropping board can be readily removed for cleaning.

Since the cage is free to revolve or oscillate by the movements of the hens therein and the perch bars will revolve or rock on their axes if the hens attempt to rest thereon, the hens are prevented from sitting quietly and will soon be broken of the desire to set.

I claim as my invention:

1. The combination of a cage comprising end pieces and spaced connecting bars which are arranged to form an inclosure in which the hen is confined and are free to revolve about their respective axes, means for holding said parts together, and means by which said cage is rotatably supported.

2. The combination of a rotatable cage comprising end pieces and spaced connecting bars which are arranged to form a substantially unobstructed inclosure in which the hen is confined and are free to revolve about their respective axes, and means for holding said parts together, said cage being adapted to be revolved by the hen stepping from one bar to another, and said revoluble bars preventing the hen from resting quietly thereon.

3. The combination of a rotatable cage comprising end pieces, stay rods rigidly connecting said end pieces, and spaced bars which extend from one end piece to the other and are free to revolve about their respective axes, said stay rods and bars being substantially parallel and arranged substantially in a single circular series to form a substantially unobstructed inclosure in which the hen is confined, said cage being adapted to be revolved by the hen stepping from one bar to another, and said revoluble bars preventing the hen from resting quietly thereon.

4. The combination of a rotatable cage, and a circular receptacle for food or water fixed on said revolving cage concentric with the axis of rotation thereof and having a central opening affording access to the contents of the receptacle.

5. The combination of a rotatable cage, and an annular wall fixed on the end of said cage concentric with the axis of rotation thereof and forming with said end a receptacle having a central opening affording access to the contents of the receptacle.

Witness my hand, this 10th day of April, 1916.

ALBERT E. JOHNSON.

Witnesses:
KARL E. WILHELM,
A. L. McGEE.

Copies of this patent may be obtained for five cents each, by addressing the "Commissioner of Patents, Washington, D. C."